US012615165B2

(12) United States Patent　　(10) Patent No.: US 12,615,165 B2
Sandahl　　(45) Date of Patent: Apr. 28, 2026

(54) POWER SOURCING EQUIPMENT

(71) Applicant: Axis AB, Lund (SE)

(72) Inventor: Anders Sandahl, Lund (SE)

(73) Assignee: AXIS AB, Lund (SE)

( * ) Notice: Subject to any disclaimer, the term of this patent is extended or adjusted under 35 U.S.C. 154(b) by 26 days.

(21) Appl. No.: 18/584,322

(22) Filed: Feb. 22, 2024

(65) Prior Publication Data

US 2024/0333539 A1　　Oct. 3, 2024

(30) Foreign Application Priority Data

Mar. 30, 2023　(EP) ..................................... 23165328

(51) Int. Cl.
　　*H04L 12/10*　　(2006.01)
　　*H02J 1/10*　　(2026.01)
(52) U.S. Cl.
　　CPC ................ *H04L 12/10* (2013.01); *H02J 1/10* (2013.01)
(58) Field of Classification Search
　　CPC ........... H04L 12/10; H02J 1/10; H05B 47/187
　　See application file for complete search history.

(56) References Cited

U.S. PATENT DOCUMENTS

2007/0263675 A1　11/2007　Lum et al.
2008/0311877 A1 *　12/2008　Darshan ................... G06F 1/266
　　　　　　　　　　　　455/402

2010/0217965 A1　8/2010　Wolff
2011/0163605 A1 *　7/2011　Ronen ...................... H04L 12/10
　　　　　　　　　　　　307/71
2012/0079294 A1　3/2012　Diab
2018/0013319 A1 *　1/2018　Kanarellis ............. H02J 7/0024
2018/0054083 A1 *　2/2018　Hick ........................ H04L 12/10
2019/0253268 A1　8/2019　Fu et al.
2022/0151043 A1 *　5/2022　Bassi ..................... H05B 45/38

FOREIGN PATENT DOCUMENTS

GB　　　2585883　A　　1/2021
KR　　102301767　B1　　9/2021

* cited by examiner

*Primary Examiner* — Daniel Cavallari
*Assistant Examiner* — Rasem Mourad
(74) *Attorney, Agent, or Firm* — Volpe Koenig

(57) ABSTRACT

A power sourcing equipment (PSE) device for controlling delivery of electric power to a powered device (PD) connected to the PSE device comprises a first input port for reception of input data and electric power from a power over Ethernet (PoE) device such as a PoE switch, a second input port for reception of electric power from a power source other than the PoE device and an output port for provision of the input data received at the first input port and the electric power received at the second input port to the PD. The PSE device further comprises control circuitry that is configured to determine a discontinuation of reception of electric power from the PoE device and configured to, in response to a determination of a discontinuation of reception of electric power from the PoE device, control discontinuation of provision of the electric power to the PD.

8 Claims, 3 Drawing Sheets

POWER SOURCING EQUIPMENT

FIELD OF INVENTION

The present disclosure relates to a power sourcing equipment (PSE) device that provides delivery of electric power to a powered device (PD) and a corresponding method.

TECHNICAL BACKGROUND

Electronic devices such as surveillance cameras connected to power over Ethernet (PoE) switches can be powered off by disabling the corresponding port in the PoE switch. This is useful when a device needs to be restarted for one reason or another. More power-hungry devices, such as high-end Pan/Tilt/Zoom (PTZ) cameras, need more power than can be delivered by a PoE switch. Therefore, such devices need to be powered by another PSE device, such as a so-called midspan. However, in such situations, it is not possible to power off the device simply by disabling the port in the PoE switch, due to the fact that the midspan will keep delivering power to the device regardless of what the PoE switch does.

SUMMARY

An object is to overcome the drawbacks as summarized above and according to a first aspect there is provided a PSE device for controlling delivery of electric power to a powered device (PD) connected to the PSE device. The PSE device comprises a first input port for reception of input data and electric power from a PoE device such as a PoE switch, a second input port for reception of electric power from a power source other than the PoE device and an output port for provision of the input data received at the first input port and the electric power received at the second input port to the PD. The PSE device further comprises control circuitry that is configured to determine a discontinuation of reception of electric power from the PoE device and configured to, in response to a determination of a discontinuation of reception of electric power from the PoE device, control discontinuation of provision of the electric power to the PD.

In other words, by configuring the PSE device, e.g., a midspan or PoE injector, with circuitry that is configured to detect when no power is available on the data input port of the midspan, i.e., the input port connected to the PoE device, the midspan detects this and shuts off power to the powered device, e.g., a camera, and thereby enabling a power off restart of the powered device.

The PSE device may comprise an input transformer connected to the first input port, an output transformer connected to the output port and a power supply path connecting the second input port and the output transformer. The control circuitry may be connected to the input transformer and connected to a power supply switch arranged along the power supply path. The control circuitry may further be configured to open the power supply switch, and thereby discontinue provision of electric power to the PD via the power supply path, in response to a detection of a discontinuation of reception of electric power from the PoE device. The input transformer may comprise a plurality of primary windings connected to the first input port. In such an example, the control circuitry may be connected to the plurality of primary windings of the input transformer via a voltage detector. The output transformer may comprise a plurality of primary windings connected to the output port, and the power supply path may connect the second input port and the plurality of primary windings of the output transformer.

In other words, by configuring a PSE device with a voltage detector, a power supply switch and configuring the control circuitry such that it detects input power via the voltage detector and controls the power supply switch, a simple construction is obtained that enables a reliable power off restart of the powered device.

The control circuitry may further be configured to determine a resumption of reception of electric power from the PoE device and configured to, in response to a determination of resumption of reception of electric power from the PoE device, control resumption of provision of the electric power to the PD.

In some embodiments, the control circuitry may be connected to the voltage detector via a low-pass filter. Such a configuration is advantageous in that it avoids, by a suitable configuration of the low-pass filter characteristics, undesired power-off and/or power-on detections due to brief or momentary glitch in the power supplied by the PoE device.

In a second aspect there is provided a method for controlling delivery of electric power to a PD connected to a PSE device. Such a method comprises determining a discontinuation of reception of electric power from a PoE device, such as a PoE switch, connected to the PSE device, and in response to the determination of a discontinuation of reception of electric power from the PoE device, controlling discontinuation of provision of the electric power to the PD.

Such a method enables detection of when no power is available on the data input port of the midspan, i.e., the input port connected to the PoE device, and shutting off of power to the powered device, e.g., a camera, and thereby enabling a power off restart of the powered device.

The step of determining a discontinuation of reception of electric power from the PoE device may comprise determining a voltage drop from a first voltage level to a second voltage level and determining that the second voltage level is maintained during a threshold time interval. As a consequence of such a determination that the second voltage level is maintained during a threshold time interval, the discontinuation of reception of electric power from the PoE device can be determined.

In other words, a low-pass filtering function is obtained in that undesired power-off detections due to brief or momentary glitch in the power supplied by the PoE device can be avoided.

The method may comprise a step of determining a resumption of reception of electric power from the PoE device and in response to such a determination of resumption of reception of electric power from the PoE device, a step of controlling resumption of provision of the electric power to the PD.

In such embodiments, the step of determining a resumption of reception of electric power from the PoE device may comprise determining a voltage jump from a third voltage level to a fourth voltage level and determining that the fourth voltage level is maintained during a threshold time interval. As a consequence of the determination that the fourth voltage level is maintained during a threshold time interval, the resumption of reception of electric power from the PoE device can be determined.

In other words, also in the scenario involving resumption of power, a low-pass filtering function is obtained in that undesired power-on detections due to brief or momentary glitch in the power supplied by the PoE device can be avoided.

In a third aspect there is provided a non-transitory computer-readable storage medium having stored thereon instructions for implementing the method as summarized above, when executed on a device having processing capabilities.

Such a non-transitory computer-readable storage medium has corresponding effects and advantages as the device of the first aspect and the method of the second aspect.

BRIEF DESCRIPTION OF THE DRAWINGS

The above and other aspects of the present disclosure will now be described in more detail, with reference to appended figures. The figures should not be considered limiting; instead, they are used for explaining and understanding. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1A:
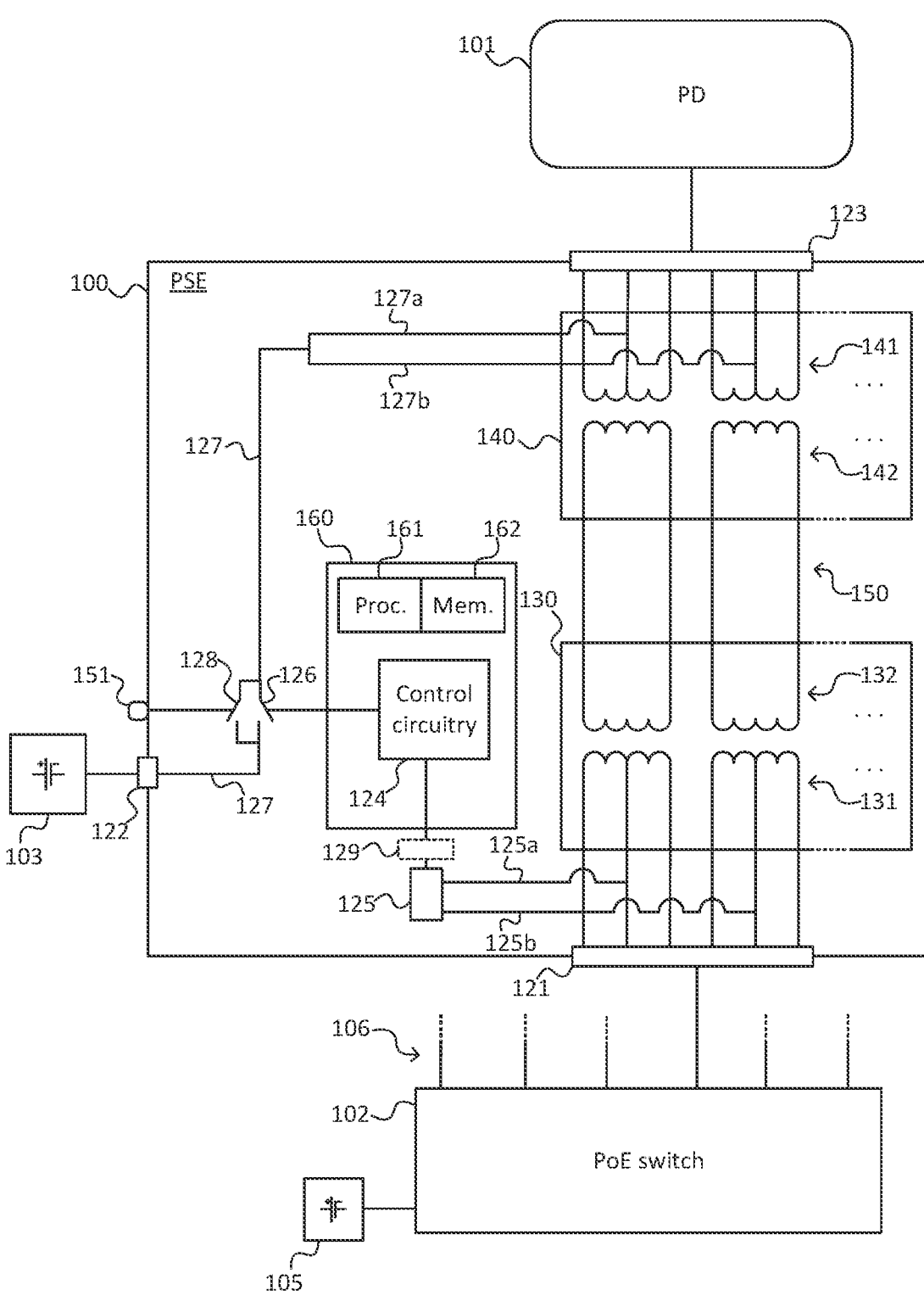
FIG. 1a schematically illustrates a PSE device connected to a PoE switch and a powered device, FIG. 1b schematically illustrates a PSE device connected to a PoE switch and a powered device.

Reference will now be made to FIG. 1a, which illustrates an embodiment of a PSE device 100 for controlling delivery of electric power to a PD 101 connected to the PSE device 100. The PSE device 100 comprises a first input port 121 for reception of input data and electric power from a PoE device 102 in the form of a PoE switch, a second input port 122 for reception of electric power from a power source 103 other than the PoE device 102 and an output port 123 for provision of the input data received at the first input port 121 and the electric power received at the second input port 122 to the PD 101. The second input port 122 may typically receive electric power from a power source 103 such as an electric wall socket. The PSE device 100 further comprises control circuitry 124 configured to determine a discontinuation of reception of electric power from the PoE device 102 and configured to, in response to a determination of a discontinuation of reception of electric power from the PoE device 102, control discontinuation of provision of the electric power to the PD 101.

As indicated, the PoE device 102 is provided with electric power from a power source 105, which may be an ordinary power outlet. Furthermore, the first input port 121 receives input data and electric power from one of a plurality of ports 106 of the PoE device 102.

The control circuitry 124 may further be configured to determine a resumption of reception of electric power from the PoE device 102 and further configured to, in response to a determination of resumption of reception of electric power from the PoE device 102, control resumption of provision of the electric power to the PD.

The embodiment of the PSE device 100 in FIG. 1a comprises an input transformer 130 connected to the first input port 121 and an output transformer 140 connected to the output port 123. A power supply path 127 connects the second input port 122 and the output transformer 140. The control circuitry 124 is connected to the input transformer 130 and connected to a power supply switch 126 arranged along the power supply path 127. Moreover, the control circuitry 124 is configured to open the power supply switch 126 and thereby discontinue provision of electric power to the PD 101 via the power supply path 127, in response to a detection of a discontinuation of reception of electric power from the PoE device 102.

A data interface 150 connects the input transformer 130 and the output transformer 140. That is, only data is conveyed via the data interface 150. Electric power from the PoE device is thus not conveyed to the output transformer 140 and the PD 101.

An override switch 128 may also be arranged along the power supply path 127 and thereby enabling uninterrupted supply of power to the PD 101, which may be necessary in a situation where the first input port 121 of the PSE device 100 is connected to a switch that does not comprise PoE functionality. Uninterrupted supply of power to the PD 102 is thus enabled by closing the override switch 128, for example manually via an override actuator 151 externally arranged on the PSE device 100.

Furthermore, the input transformer 130 comprises a plurality of primary windings 131 connected to the first input port 121. The control circuitry 124 is connected to the plurality of primary windings 131 of the input transformer 130 via a voltage detector 125. For example, as illustrated, detector leads 125a and 125b may be connected to a respective primary winding 131 of the input transformer 130. The output transformer 140 comprises a plurality of primary windings 141 connected to the output port 123. The power supply path 127 connects the second input port 122 and the plurality of primary windings 141 of the output transformer 140. For example, as illustrated, power leads 127a and 127b may be connected to a respective primary winding 141 of the output transformer 140.

As exemplified in FIG. 1a, the control circuitry 124 may be connected to the voltage detector 125 via a low-pass filter 129 that has an effect of preventing high-frequency fluctuations. i.e., rapid changes, in the voltage detected by the voltage detector 125 to be determined as true discontinuations of power provision. That is, brief glitches in the power supplied by the PoE device 102 will be filtered and therefore not sensed as a discontinuation of reception of electric power from the PoE device 102. The low-pass filter 129 may be realized by way of an RC-circuit or an LC circuit having respective appropriate impedance values and thereby realize an appropriate time constant of, e.g., 0.5 s.

FIG. 1a illustrates an example embodiment where the control circuitry 124 is realized within a controller 160. Such a controller 160 is configured to carry out overall control of functions and operations of the PSE device 100, including functions performed in the context of the control circuitry 124. The controller 160 may include a processor 161, such as a central processing unit (CPU), microcontroller, or microprocessor. The processor 161 is configured to execute program code stored in a memory 162 in order to carry out functions and operations of the PSE device 100.

The memory 162 may be one or more of a buffer, a flash memory, a hard drive, a removable medium, a volatile memory, a non-volatile memory, a random access memory (RAM), or another suitable device. In a typical arrangement, the memory 162 may include a non-volatile memory for long term data storage and a volatile memory that functions as system memory for the controller 160. The memory 162 may exchange data with the processor 161 over a data bus.

Accompanying control lines and an address bus between the memory 162 and the processor 161 may also be present.

Functions and operations of the PSE device 100, including embodiments of a method performed in the context of the control circuitry 124 as will be exemplified below, may be embodied in the form of instructions or executable logic routines (e.g., lines of code, software programs, etc.) that are stored on a non-transitory computer readable medium (e.g., the memory 162) of the PSE device 100 and are executed by the processor 161. Furthermore, the functions and operations of the PSE device 100 may be a stand-alone software application or form a part of a software application that carries out additional tasks related to the PSE device 100. The described functions and operations may be considered a method that the corresponding part of the device is configured to carry out.

Figure 1B:
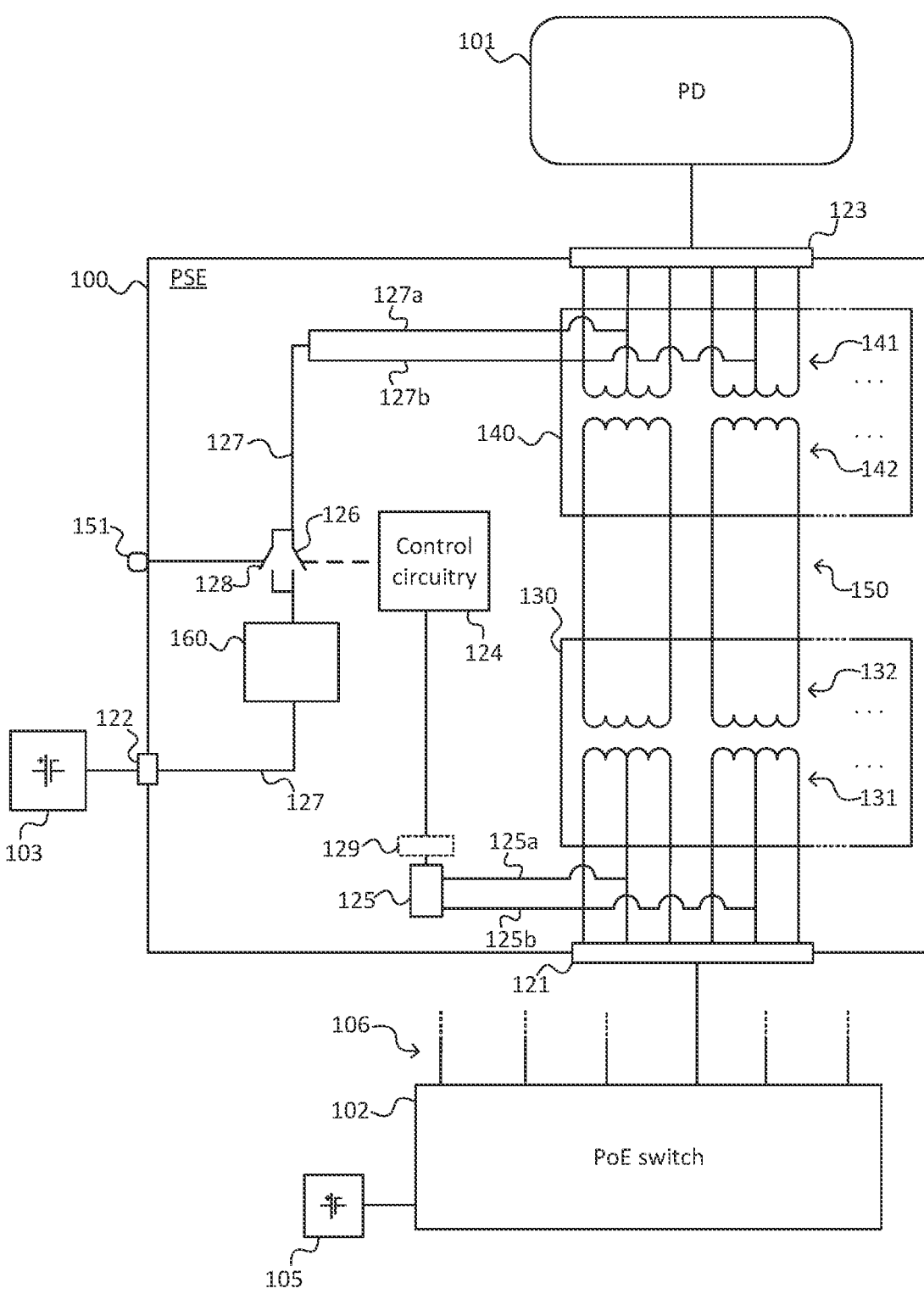

Also, while the described functions and operations may be implemented in software, such functionality may as well be carried out via dedicated hardware or firmware, or some combination of hardware, firmware and/or software. For example, as FIG. 1*b* illustrates, the control circuitry 124 may be separated from the controller 160 and as such be circuitry dedicated to perform the control of delivery of electric power to a PD as described herein.

Figure 2:
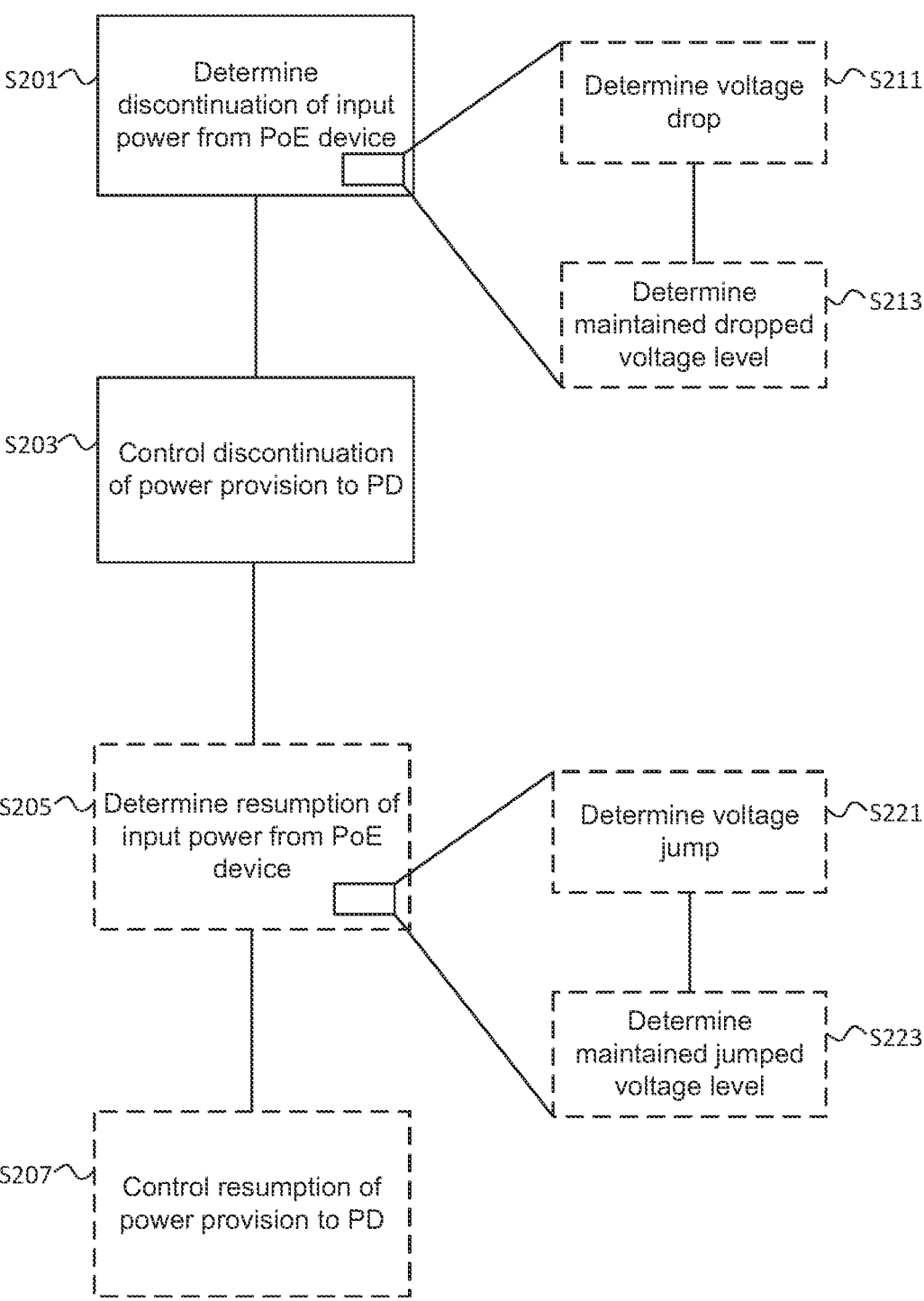
FIG. 2 is a flow chart of a method.

With reference to FIG. 2, a method for controlling delivery of electric power to a PD 101 connected to a PSE device 100 comprises a determining step S201 where a discontinuation of reception of electric power from the PoE device 102 is determined. In response to the determination in the determining step S201 of a discontinuation of reception of electric power from the PoE device 102, a controlling step S203 is performed where provision of the electric power to the PD 101 is discontinued.

The determining step S201 where a discontinuation of reception of electric power from the PoE device 102 is determined may comprise a determining step S211 where a voltage drop from a first voltage level to a second voltage level is determined. A determination is then made, in a determining step S213, that the second voltage level is maintained during a threshold time interval, and as a consequence of the determination that the second voltage level is maintained during a threshold time interval, the discontinuation of reception of electric power from the PoE device 102 is determined. In other words, by introducing such a condition that the voltage drop must be maintained for a period of time, it is possible to prevent high-frequency fluctuations. i.e., rapid changes, in the voltage detected by the voltage detector 125 to be determined as true discontinuations of power provision. Similar to the functionality of the low-pass filter 129 described above in connection with FIGS. 1*a* and 1*b*, brief glitches in the power supplied by the PoE device 102 will be filtered and therefore not sensed as a discontinuation of reception of electric power from the PoE device 102.

The method may further comprise a determining step S205 where a resumption of reception of electric power from the PoE device 102 is determined. In response to the determination of resumption of reception of electric power from the PoE device 102 in determination step S205, resumption of provision of the electric power to the PD 101 may be controlled in a controlling step S207.

The determining step S205 where a resumption of reception of electric power from the PoE device 102 is determined may comprise a determining step S221 where a voltage jump from a third voltage level to a fourth voltage level is determined. A determination is then made, in a determining step S223 that the fourth voltage level is maintained during a threshold time interval, and as a consequence of the determination that the fourth voltage level is maintained during a threshold time interval, the resumption of reception of electric power from the PoE device 102 is determined. In other words, by introducing such a condition that the voltage jump must be maintained for a period of time, it is possible to prevent high-frequency fluctuations. i.e., rapid changes, in the voltage detected by the voltage detector 125 to be determined as true resumption of power provision. Similar to the functionality of the low-pass filter 129 described above in connection with FIGS. 1*a* and 1*b*, brief glitches in the power supplied by the PoE device 102 will be filtered and therefore not sensed as a resumption of reception of electric power from the PoE device 102.

In analogy with the low-pass filter discussed above in connection with FIGS. 1*a* and 1*b*, the threshold time interval of steps and S213 and S223 may be a predetermined interval having a value of, e.g., 0.5 s.

The person skilled in the art realizes that the present disclosure by no means is limited to the preferred embodiments described above. On the contrary, many modifications and variations are possible within the scope of the appended claims.

Additionally, variations to the disclosed embodiments can be understood and effected by the skilled person in practicing the claimed disclosure, from a study of the drawings, the disclosure, and the appended claims.

The invention claimed is:

1. A power sourcing equipment (PSE) device for controlling delivery of electric power to a powered device (PD) connected to the PSE device, comprising:
    a first input port for reception of input data and electric power from a power over Ethernet (POE) device,
    a second input port for reception of electric power from a power source other than the PoE device,
    an output port for provision of the input data received at the first input port and the electric power received at the second input port to the PD, and
    control circuitry configured to determine a discontinuation of reception of electric power from the PoE device and configured to, in response to a determination of a discontinuation of reception of electric power from the PoE device, control discontinuation of provision of the electric power from the power source other than the PoE device to the PD.

2. The PSE device of claim 1, comprising:
    an input transformer connected to the first input port,
    an output transformer connected to the output port,
    a power supply path connecting the second input port and the output transformer, wherein:
    the control circuitry is connected to the input transformer and connected to a power supply switch arranged along the power supply path, and
    the control circuitry is configured to open the power supply switch, and thereby discontinue provision of electric power to the PD via the power supply path, in response to a detection of a discontinuation of reception of electric power from the PoE device.

3. The PSE device of claim 2, further comprising a voltage detector and wherein:
    the input transformer comprises a plurality of primary windings connected to the first input port,
    the control circuitry is connected to the plurality of primary windings of the input transformer via the voltage detector,
    the output transformer comprises a plurality of primary windings connected to the output port, and the power supply path connects the second input port and the plurality of primary windings of the output transformer.

4. The PSE device of claim 1, wherein:

the control circuitry is configured to determine a resumption of reception of electric power from the PoE device and configured to, in response to a determination of resumption of reception of electric power from the PoE device, control resumption of provision of the electric power to the PD.

5. The PSE device of claim 2, wherein:

the control circuitry is configured to determine a resumption of reception of electric power from the PoE device and configured to, in response to a determination of resumption of reception of electric power from the PoE device, control resumption of provision of the electric power to the PD.

6. The PSE device of claim 3, wherein:

the control circuitry is configured to determine a resumption of reception of electric power from the PoE device and configured to, in response to a determination of resumption of reception of electric power from the PoE device, control resumption of provision of the electric power to the PD.

7. The PSE device of claim 3, further comprising a low-pass filter and wherein:

the control circuitry is connected to the voltage detector via the low-pass filter.

8. The PSE device of claim 4, further comprising a low-pass filter and a voltage detector and wherein:

the control circuitry is connected to the voltage detector via the lowpass filter.

* * * * *